US012682177B2

(12) United States Patent
Feng et al.

(10) Patent No.: US 12,682,177 B2
(45) Date of Patent: Jul. 14, 2026

(54) GENERATING GOAL-ORIENTED DIALOGUES FROM DOCUMENTS

(71) Applicant: International Business Machines Corporation, Armonk, NY (US)

(72) Inventors: Song Feng, New York, NY (US); Chulaka Gunasekara, New Hyde Park, NY (US); Hui Wan, White Plains, NY (US); Jatin Ganhotra, Jersey City, NJ (US); Siva Sankalp Patel, White Plains, NY (US); Sachindra Joshi, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 17/808,628

(22) Filed: Jun. 24, 2022

(65) Prior Publication Data

US 2023/0419045 A1      Dec. 28, 2023

(51) Int. Cl.
| | |
|---|---|
| *G06F 40/35* | (2020.01) |
| *G06F 40/49* | (2020.01) |

(52) U.S. Cl.
CPC .............. *G06F 40/35* (2020.01); *G06F 40/49* (2020.01)

(58) Field of Classification Search
CPC ................................. G06F 40/35; G06F 40/49
See application file for complete search history.

(56) References Cited

U.S. PATENT DOCUMENTS

| | | | |
|---|---|---|---|
| 8,285,550 B2 | 10/2012 | Wu et al. | |
| 10,387,575 B1 * | 8/2019 | Shen ........................ | G06F 40/35 |
| 10,885,906 B2 | 1/2021 | Steedman Henderson et al. | |
| 10,891,430 B2 | 1/2021 | Carter et al. | |
| 10,915,588 B2 | 2/2021 | Bakis et al. | |
| 11,036,728 B2 | 6/2021 | Torres et al. | |
| 11,170,161 B2 * | 11/2021 | Goyal ..................... | H04L 51/02 |
| 11,355,120 B1 * | 6/2022 | Talib ....................... | G10L 15/22 |

(Continued)

FOREIGN PATENT DOCUMENTS

| | | | | |
|---|---|---|---|---|
| CN | 113158665 A | * | 7/2021 | .......... G06F 40/253 |
| CN | 113168828 A | | 7/2021 | |

(Continued)

OTHER PUBLICATIONS

Feng, S., Wan, H., Gunasekara, C., Patel, S. S., Joshi, S., & Lastras, L. A. (2020). doc2dial: A goal-oriented document-grounded dialogue dataset. arXiv preprint arXiv:2011.06623. (Year: 2020).*

(Continued)

*Primary Examiner* — Hai Phan
*Assistant Examiner* — Nathan Tengbumroong
(74) *Attorney, Agent, or Firm* — Stephen R. Yoder

(57)      ABSTRACT
Provided is a computer-implemented method, system, and computer program product for generating a goal-oriented dialogue from a grounding document. A processor may analyze a corpus of text. The processor may identify, based on the analyzing, one or more semantic structures that can be used to simulate a dialogue. The processor may generate, based on the identifying, a simulated dialogue, the simulated dialogue including one or more utterances from a simulated agent and one or more utterances from a simulated user to form a dialogue flow.

15 Claims, 11 Drawing Sheets

(56) References Cited

U.S. PATENT DOCUMENTS

| | | | | |
|---|---|---|---|---|
| 11,393,454 | B1 * | 7/2022 | Acharya | G06F 40/44 |
| 12,010,268 | B2 * | 6/2024 | Beaver | H04L 51/02 |
| 2008/0167840 | A1 * | 7/2008 | Francis | G06Q 10/06 |
| | | | | 703/2 |
| 2015/0178371 | A1 * | 6/2015 | Seth | G06F 40/117 |
| | | | | 707/755 |
| 2019/0236137 | A1 | 8/2019 | Hesketh et al. | |
| 2020/0074374 | A1 | 3/2020 | Perryman et al. | |
| 2020/0286463 | A1 * | 9/2020 | Galitsky | G06F 16/35 |
| 2020/0402507 | A1 * | 12/2020 | Neelakantan | G10L 15/1822 |
| 2021/0350125 | A1 * | 11/2021 | Arvela | G06V 30/418 |
| 2021/0383077 | A1 | 12/2021 | Contractor et al. | |
| 2022/0012410 | A1 | 1/2022 | Dhoolia et al. | |
| 2022/0156582 | A1 * | 5/2022 | Sengupta | G06N 3/042 |
| 2022/0277149 | A1 * | 9/2022 | Altschul | G06N 7/01 |
| 2023/0026945 | A1 * | 1/2023 | Friedlander | G06N 3/045 |

FOREIGN PATENT DOCUMENTS

| | | | |
|---|---|---|---|
| CN | 114625855 A | * | 6/2022 |
| WO | WO-2022057712 A1 | * | 3/2022 |

OTHER PUBLICATIONS

Asri et al., "A Sequence-to-Sequence Model for User Simulation in Spoken Dialogue Systems," https://arxiv.org/pdf/1607.00070.pdf, Jun. 30, 2016, 5 pgs.

Fabbri et al., "Template-Based Question Generation from Retrieved Sentences for Improved Unsupervised Question Answering," https://arxiv.org/abs/2004.11892, Apr. 24, 2020, 6 pgs.

Gao et al., "Interconnected Question Generation with Coreference Alignment and Conversation Flow Modeling," https://aclanthology.org/P19-1480.pdf, Proceedings of the 57th Annual Meeting of the Association for Computational Linguistics, © 2019 Association for Computational Lingquistics.

Gu et al., "ChainCQG: Flow-Aware Conversational Question Generation," https://arxiv.org/pdf/2102.02864.pdf, Feb. 4, 2021, 10 pgs.

Gunasekara et al., "Summary Grounded Conversation Generation," https://arxiv.org/abs/2106.03337, Jun. 7, 2021, 9 pgs.

Li et al., "A Diversity-Promoting Objective Function for Neural Conversation Models," https://arxiv.org/abs/1510.03055, Jun. 10, 2016, 11 pgs.

Lin et al., "Dialog Simulation with Realistic Variations for Training Goal-Oriented Conversational Systems," https://arxiv.org/pdf/2011.08243.pdf, Nov. 16, 2020, 9 pgs.

Mell et al., "The NIST Definition of Cloud Computing," Recommendations of the National Institute of Standards and Technology, U.S. Department of Commerce, Special Publication 800-145, Sep. 2011, 7 pgs.

Qi et al., "Stay Hungry, Stay Focused: Generating Informative and Specific Questions in Information-Seeking Conversations," https://arxiv.org/pdf/2004.14530.pdf, Oct. 20, 2020, 16 pgs.

Scheffler et al., "Automatic Learning of Dialogue Strategy Using Dialogue Simulation and Reinforcement earning," https://arxiv.org/pdf/1607.00070.pdf, Jan. 2002, 8 pgs.

Unknown, "Metric Card for SQuAD," https://huggingface.co/spaces/evaluate-metric/squad, printed Jun. 17, 2022, 4 pgs.

Unknown, "Metrick: bleu," https://huggingface.co/spaces/evaluate-metric/bleu, printed Jun. 17, 2022, 5 pgs.

* cited by examiner

100

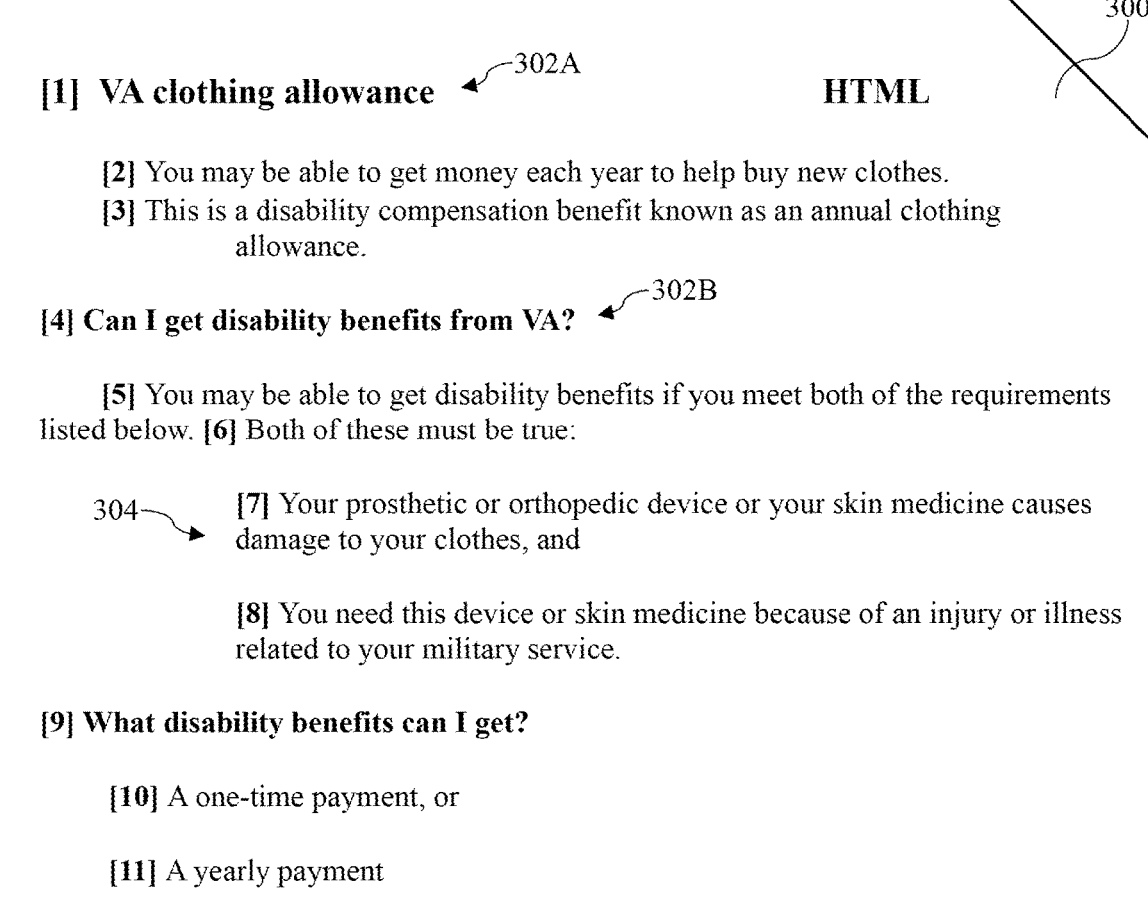

[1] VA clothing allowance ← 302A                                    HTML

[2] You may be able to get money each year to help buy new clothes.
[3] This is a disability compensation benefit known as an annual clothing allowance.

[4] Can I get disability benefits from VA? ← 302B

[5] You may be able to get disability benefits if you meet both of the requirements listed below. [6] Both of these must be true:

304 → [7] Your prosthetic or orthopedic device or your skin medicine causes damage to your clothes, and

[8] You need this device or skin medicine because of an injury or illness related to your military service.

[9] What disability benefits can I get?

[10] A one-time payment, or

[11] A yearly payment

[12] Note: The current clothing allowance rate is $817.48

"You might be eligible for VA disability benefits."          ("would you like to know if you are eligible?")
                                                              follow-up $S_{n+1}$          $S_{n+2}$          $S_{n+3}$          ...          Dialogue act 510 — | Agent header |                    | User header |

512

506 — | Encoder |

504

502

| Tokens | ... | $s_i$ | <LF> | $s_{i+1}$ | <TL2> | $s_{i+2}$ | <TL1> | $s_{i+3}$ | <Dial> | ... |
|---|---|---|---|---|---|---|---|---|---|---|
| Token Embedding | ... | $E_{si}$ | $E_{<LF>}$ | $E_{si+1}$ | $E_{<TL>}$ | $E_{si+2}$ | $E_{<DP>}$ | $E_{si+3}$ | $E_{<Dial>}$ | |
| Type Embedding | ... | $E_{dial}$ | $E_{doc}$ | $E_{doc}$ | $E_{doc\text{-}title}$ | $E_{doc\text{-}title}$ | $E_{doc}$ | $E_{doc}$ | $E_{dial}$ | $E_{dial}$ |
| Structure Embedding | ... | $E_0$ | $E_1$ | $E_1$ | $E_2$ | $E_2$ | $E_3$ | $E_3$ | $E_1$ | $E_1$ |

| | DIST-1 | DIST-2 | DIST-3 | DIST-4 |
|---|---|---|---|---|
| Human | 0.0204 | 0.1934 | 0.4631 | 0.6693 |
| Generated | 0.0066 | 0.597 | 0.1569 | 0.2587 |

602

| | UNIQUE-1 | UNIQUE-2 | UNIQUE-3 | UNIQUE-4 |
|---|---|---|---|---|
| Human | 5,302 | 46,030 | 100,566 | 131,621 |
| Generated | 4,231 | 34,412 | 80,305 | 116,007 |

604

| BART-base Generation | Validation | | Test | |
|---|---|---|---|---|
| | EM | BLEU-4 | EM | BLEU-4 |
| 100% train data | 27.29 | 31.14 | 30.65 | 34.66 |
| 100% train data + 1 x train-aug | 29.47 | 30.65 | 30.64 | 34.97 |
| 100% train data + 2 x train-aug | 28.83 | 29.85 | 30.82 | 33.62 |
| 100% train data + 3 x train-aug | 30.80 | 32.64 | 31.28 | 35.15 |
| 100% train data + 3 x train-aug + 1 x valid aug | 32.45 | 32.58 | 30.80 | 34.36 |

700

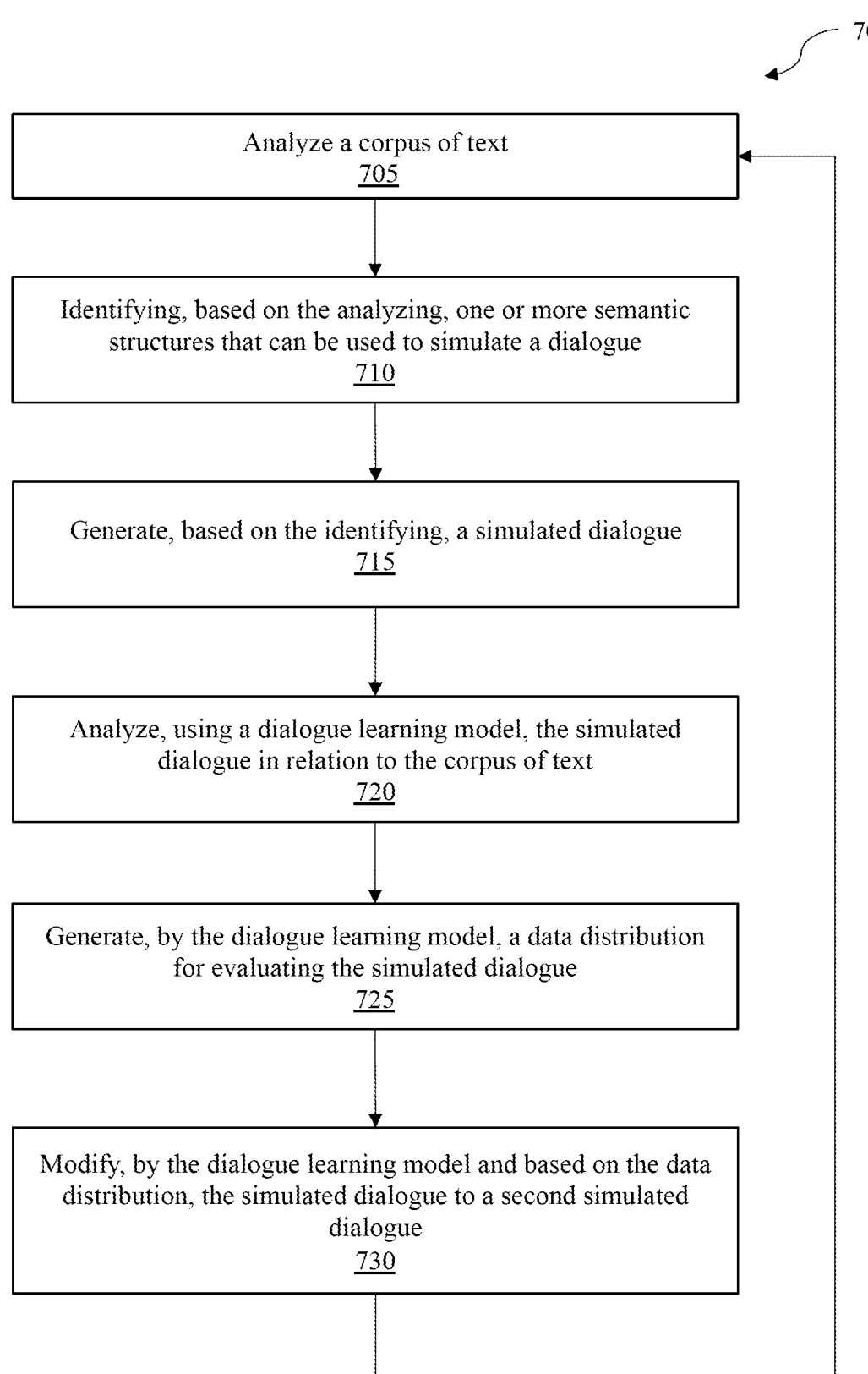

Analyze a corpus of text
705

Identifying, based on the analyzing, one or more semantic
structures that can be used to simulate a dialogue
710

Generate, based on the identifying, a simulated dialogue
715

Analyze, using a dialogue learning model, the simulated
dialogue in relation to the corpus of text
720

Generate, by the dialogue learning model, a data distribution
for evaluating the simulated dialogue
725

Modify, by the dialogue learning model and based on the data
distribution, the simulated dialogue to a second simulated
dialogue
730

FIG. 7

GENERATING GOAL-ORIENTED DIALOGUES FROM DOCUMENTS

BACKGROUND

The present disclosure relates generally to the field of natural language understanding and, more specifically, to generating goal-oriented dialogues from documents.

Natural language understanding (NLU) is a subfield of natural language processing (NLP), which involves transforming human language into a machine readable format. Both NLP and NLU aim to make sense of unstructured data, but there is a difference between the two. NLP is concerned with how computers are programmed to process language and facilitate "natural" back-and-forth communication between computers and humans. NLU, on the other hand, focuses on a machine's ability to understand the human language. NLU refers to how unstructured data is rearranged so that machines may "understand" and analyze it. Put another way, before a computer can process unstructured text into a machine-readable format, first machines need to understand the peculiarities of the human language.

SUMMARY

Embodiments of the present disclosure include a computer-implemented method, system, and computer program product for generating a goal-oriented dialogue from a structured document. A processor may analyze a corpus of text. The processor may identify, based on the analyzing, one or more semantic structures that can be used to simulate a dialogue. The processor may generate, based on the identifying, a simulated dialogue, wherein the simulated dialogue comprises one or more utterances from a simulated agent and one or more utterances from a simulated user to form a dialogue flow.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3 illustrates an example grounding document, in accordance with some embodiments of the present disclosure.

FIG. 5 illustrates an example dialogue planner, in accordance with some embodiments of the present disclosure.

FIG. 7 illustrates an example process for generating a goal-oriented dialogue, in accordance with some embodiments of the present disclosure.

Figure 1:
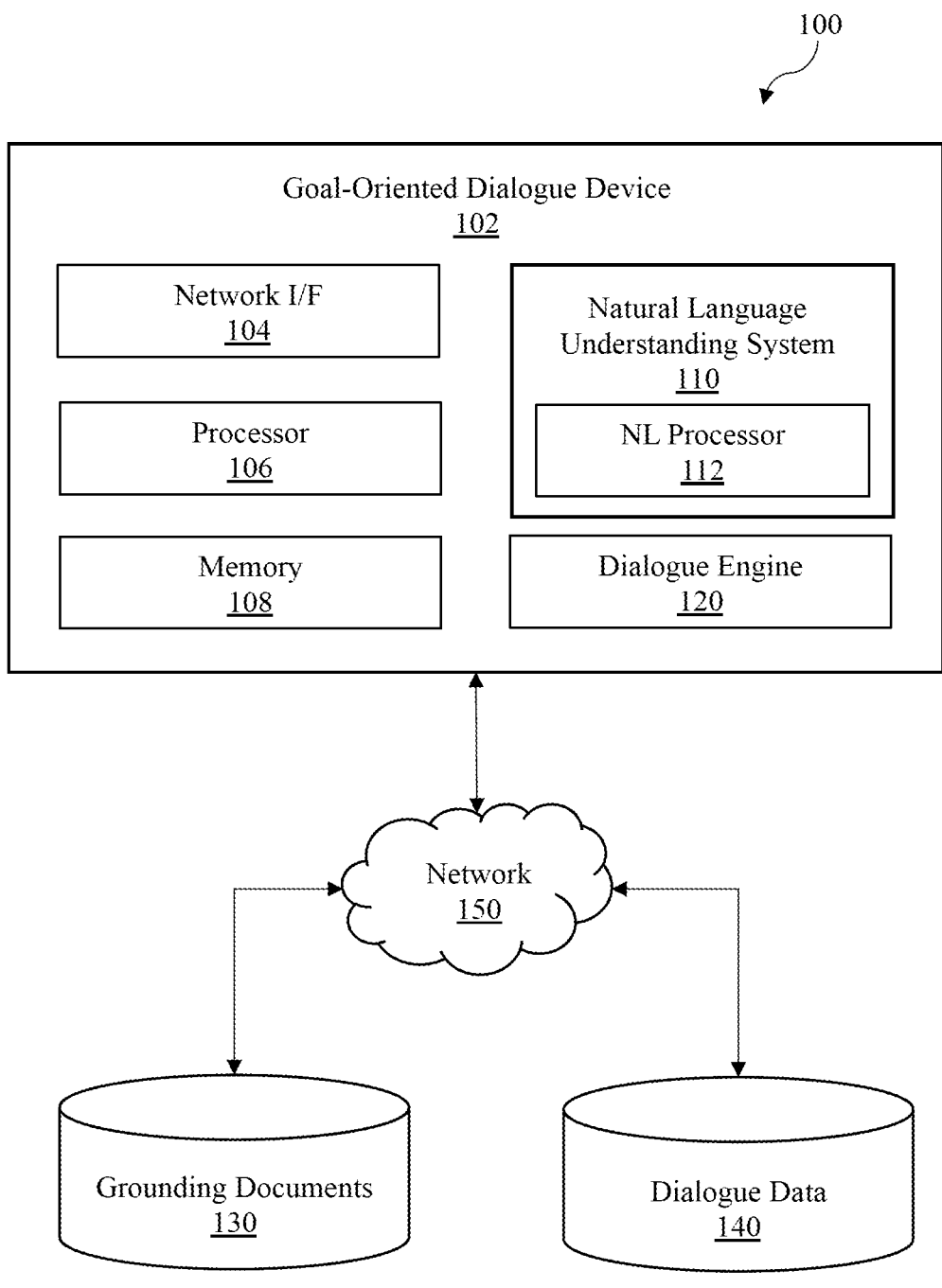
FIG. 1 illustrates an example goal-oriented dialogue system, in accordance with some embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of natural language understanding and, more particularly, to generating goal-oriented dialogues from documents. While the present disclosure is not necessarily limited to such applications, various aspects of the disclosure may be appreciated through a discussion of various examples using this context.

Natural language understanding (NLU) is a subfield of natural language processing (NLP), which involves transforming human language into a machine readable format. Both NLP and NLU aim to make sense of unstructured data, but there is a difference between the two. NLP is concerned with how computers are programmed to process language and facilitate "natural" back-and-forth communication between computers and humans. NLU, on the other hand, focuses on a machine's ability to understand the human language. NLU refers to how unstructured data is rearranged so that machines may "understand" and analyze it. Put another way, before a computer can process unstructured text into a machine-readable format, first machines need to understand the peculiarities of the human language.

There is a vast amount of electronic document content created for end users. Making the content accessible interactively via natural language queries is an important task in customer care. Typically, this is done by training a goal-oriented dialogue system (e.g., chatbot, conversation model, etc.) to track a dialogue flow and carry out an effective conversation under various situations to meet the user's end goal. For example, the user may be asking the system how to apply for healthcare benefits, and the system may be trained to effectively answer the user's query. However, training neural conversational models to respond to such queries in a logical and accurate manner requires substantial training using numerous amounts of human generated dialogue data in order to create high quality goal-oriented dialogue. In most instances, dialogue data is typically created via crowdsourcing. However, there are significant obstacles, such as costs and data content availability. For example, it may be a complicated, prolonged, and costly process to create goal-oriented dialogues for a given domain by using crowdsourced dialogue data. Not only is it challenging to collect such data via human annotations, in most cases it is hard to scale when only limited dialogue data may be available.

Embodiments of the present disclosure include a system, computer-implemented method, and computer program product that generates goal-oriented dialogues based on structured documents without human writers. The system may use a deep learning/understanding approach to analyze contextual knowledge embedded in the document structure of one or more grounding documents in relation to historical dialogue data in order to generate diverse simulated goal-oriented dialogues. The system may simulate both the agent and user dialogue utterances based on the grounding document and historic dialogue data. Using the simulated dialogues, the system can continually optimize/augment the dialogues using a learning model to generate different data distributions for evaluation of answers to queries related to the ground document's content. In this way, the system does not require human writers to train and/or optimize the system. Using this approach allows the system to create document structured dialogue flows and provide agent follow-up clarifications based on a given query. The system may be tested and validated against real human generated dialogue data to show effectiveness of the generated dialogues and/or dialogue model. Using the simulated goal-oriented dialogues, the system can be applied to respond to actual user queries for a given new domain.

In embodiments, to generate a goal-oriented dialogue, the system may analyze a corpus of text. This may be performed using natural language understanding and/or natural language processing. The corpus of text may include one or more grounding documents having a set of semantic structures and historic dialogue data. A grounding document may include headings, subheadings, subsections, etc. For example, the grounding document may comprise a document having a title, subtitle, subsections, and various bullet points used for answering a user's query or achieving the user's goal (e.g., manual, guidebook, operating instructions, handbook, questionnaire, etc.). The historic dialogue data may include one or more historic dialogue acts comprising queries from a user and responses/answers to the given query from an agent. In embodiments, the system may generate one or more document graphs from the set of semantic structures of the grounding document. The document graph may include text spans configured as nodes and semantic relations as edges. The document graph may be used to understand the structure and context of the grounding document in order to answer a user's query or goal.

In embodiments, the system may identify, based on the analyzing, one or more semantic structures that can be used to simulate a dialogue. For example, the system may correlate contextual data and the set of semantic structures of the grounding document with a plurality of utterances (user and/or agent utterances) from the historic dialogue act. The correlation may be performed using the document graph generated above. Based on the correlation, the system may predict a simulated user utterance and a simulated agent utterance to form a dialogue flow. For example, the system may use the document graph and historic dialogue data/ dialogue act as input and generate a next turn or scene in the dialogue act for both the simulated user and the simulated agent.

In embodiments, the simulated user utterances and the simulated agent utterances may be predicted by a user dialogue planner and an agent dialogue planner, respectively. The user dialogue planner and the agent dialogue planner may use a transformer-based sequence-to-sequence model (e.g., a Bi-directional long-short term memory (LSTM) or an Auto-Regressive Transformer model) for making dialogue predictions. The planners are configured to predict what the most effective response by the simulated agent (agent utterance) should be using the grounding document and a next simulated question from the user (user utterance) based on the historic dialogue act.

In embodiments, the system generates, based on the identifying, a simulated dialogue (goal-oriented dialogue). The simulated dialogue may be generated from the predicted simulated agent utterances and the predicted user utterances to form a dialogue flow. In embodiments, a user dialogue generator will generate the simulated user utterances based on the predictions made by the user dialogue planner, and an agent dialogue generator will generate the simulated agent utterance based on the predictions made by the agent dialogue planner with respect to the grounding document.

In some embodiments, the system may use a dialogue learning model to analyze the simulated dialogue in relation to the corpus of text (e.g., grounding document, historic dialogue data). The dialogue learning model may generate a data distribution for evaluating the simulated dialogue. For example, the dialogue learning model may determine how accurate the simulated dialogue is for answering a given query based on the data distribution. The dialogue learning model may compare the precision/accuracy of the simulated dialogue with respect to the content of the grounding document. If the simulated dialogue is not accurate based on the data distribution, the dialogue learning model may modify the simulated dialogue to a second simulated dialogue. The modification may include changing (augmenting) one or more of the simulated user utterances and/or one or more of the simulated agent utterances to an alternative user or agent utterance. Once modified, the system may reanalyze the modified simulated dialogue as historic dialogue input and make further dialogue predictions based on the modified simulated dialogue. In embodiments, the dialogue learning model may continually adjust/modify/augment the simulated dialogue to improve the accuracy/precision of the system for use in answering queries. Once precision and accuracy thresholds have been met, the simulated dialogues may be used to train a conversational model (e.g., chatbot) to respond to real end user queries.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an example goal-oriented dialogue system 100 in which illustrative embodiments of the present disclosure may be implemented. In the illustrated embodiment, the goal-oriented dialogue system 100 includes goal-oriented dialogue device 102 that is communicatively coupled to grounding documents 130 and dialogue data 140 via network 150. In embodiments, goal-oriented dialogue device 102, grounding documents 130, and dialogue data 140 may be configured as any type of computer system and may be substantially similar to computer system 901 of FIG. 9. For example, grounding documents 130 and dialogue data 140 may be configured as data corpuses that are hosted/stored on one or more websites, storage systems, servers, and the like. In some embodiments, the grounding documents 130 and dialogue data 140 may be local to the goal-oriented dialogue device 102 itself.

In embodiments, network 150 may be any type of communication network, such as a wireless network, edge computing network, a cloud computing network, or any combination thereof (e.g., hybrid cloud network/environment). Network 150 may be substantially similar to, or the same as, cloud computing environment 50 described in FIG. 10. Consistent with various embodiments, a cloud computing environment may include a network-based, distributed data processing system that provides one or more edge/network/cloud computing services. Further, a cloud computing environment may include many computers (e.g., hundreds or thousands of computers or more) disposed within one or more data centers and configured to share resources (e.g., grounding documents, textual data, dialogue data, etc.) over network 150.

In some embodiments, network 150 can be implemented using any number of any suitable communications media. For example, the network may be a wide area network (WAN), a local area network (LAN), an Internet, or an intranet. In certain embodiments, the various systems may be local to each other, and communicate via any appropriate local communication medium. For example, goal-oriented dialogue device 102 may communicate with grounding documents 130 and dialogue data 140 using a WAN, one or more hardwire connections (e.g., an Ethernet cable), and/or wireless communication networks. In some embodiments, the various systems may be communicatively coupled using a combination of one or more networks and/or one or more local connections. For example, in some embodiments goal-oriented dialogue device 102 may communicate with dialogue data 140 locally, while communication between grounding documents 130 may be through a wireless communication network or hardwired connection.

In embodiments, goal-oriented dialogue device 102 includes processor 106 and memory 108. The goal-oriented dialogue device 102 may be configured to communicate with grounding documents 130 and dialogue data 140 through an internal or external network interface 104. The network interface 104 may be, e.g., a modem or a network interface card. The goal-oriented dialogue device 102 may be equipped with a display or monitor. Additionally, the goal-oriented dialogue device 102 may include optional input devices (e.g., a keyboard, mouse, scanner, or other input device), and/or any commercially available or custom software (e.g., browser software, communications software, server software, natural language processing/understanding software, search engine and/or web crawling software, filter modules for filtering content based upon predefined parameters, etc.).

In some embodiments, the goal-oriented dialogue device 102 may include natural language understanding (NLU) system 110 and dialogue engine 120. The NLU system 110 may include a natural language processor 112. The natural language processor 112 may include numerous subcomponents, such as a tokenizer, a part-of-speech (POS) tagger, a syntactic relationship identifier, a content segmenter, and a relationship identifier. An example natural language understanding system is discussed in more detail in reference to FIG. 8. The dialogue engine 120 may include a user dialogue planner, an agent dialogue planner, a user dialogue generator, and an agent dialogue generator which are further described in FIG. 2.

In embodiments, NLU system 110 is configured to analyze grounding documents 130 and generate one or more document graphs. The document graphs may be generated based on the semantic structure and context of the grounding document. For example, the grounding document may include various headings and subheading that provide guidance for accessing the most relevant information of the document. An example grounding document is described below in FIG. 3. The NLU system 110 may also analyze the context of the unstructured textual data to generate the document graph.

In embodiments, the dialogue engine 120 may utilize the document graph and the dialogue data 140 to generate a simulated goal-oriented dialogue. Dialogue engine 120 may utilize NLU system 110 to analyze context of the dialogue data 140. In embodiments, dialogue data 140 may include historic dialogue acts that comprise various historic question and answer queries (or scenes) between historic users and agents. In embodiments, the dialogue engine 120 collects/receives document graphs from NLU system 110 and correlates the document graph with the historic dialogue acts of the dialogue data 140. Based on the correlating, the dialogue engine 120 may generate a simulated goal-oriented dialogue that includes predicted dialogues/utterances between a simulated user and a simulated agent.

It is noted that FIG. 1 is intended to depict the representative major components of an exemplary goal-oriented dialogue system 100. In some embodiments, however, individual components may have greater or lesser complexity than as represented in FIG. 1, components other than or in addition to those shown in FIG. 1 may be present, and the number, type, and configuration of such components may vary.

For example, while FIG. 1 illustrates a goal-oriented dialogue system 100 with a single goal-oriented dialogue device 102, a single grounding documents 130, a single dialogue data 140, and a single network 150, suitable computing environments for implementing embodiments of this disclosure may include any number of goal-oriented dialogue systems, devices, grounding documents, dialogue data, and networks. The various modules, systems, and components illustrated in FIG. 1 may exist, if at all, across a plurality of goal-oriented dialogue systems, devices, grounding documents, dialogue data, and networks.

Figure 2:
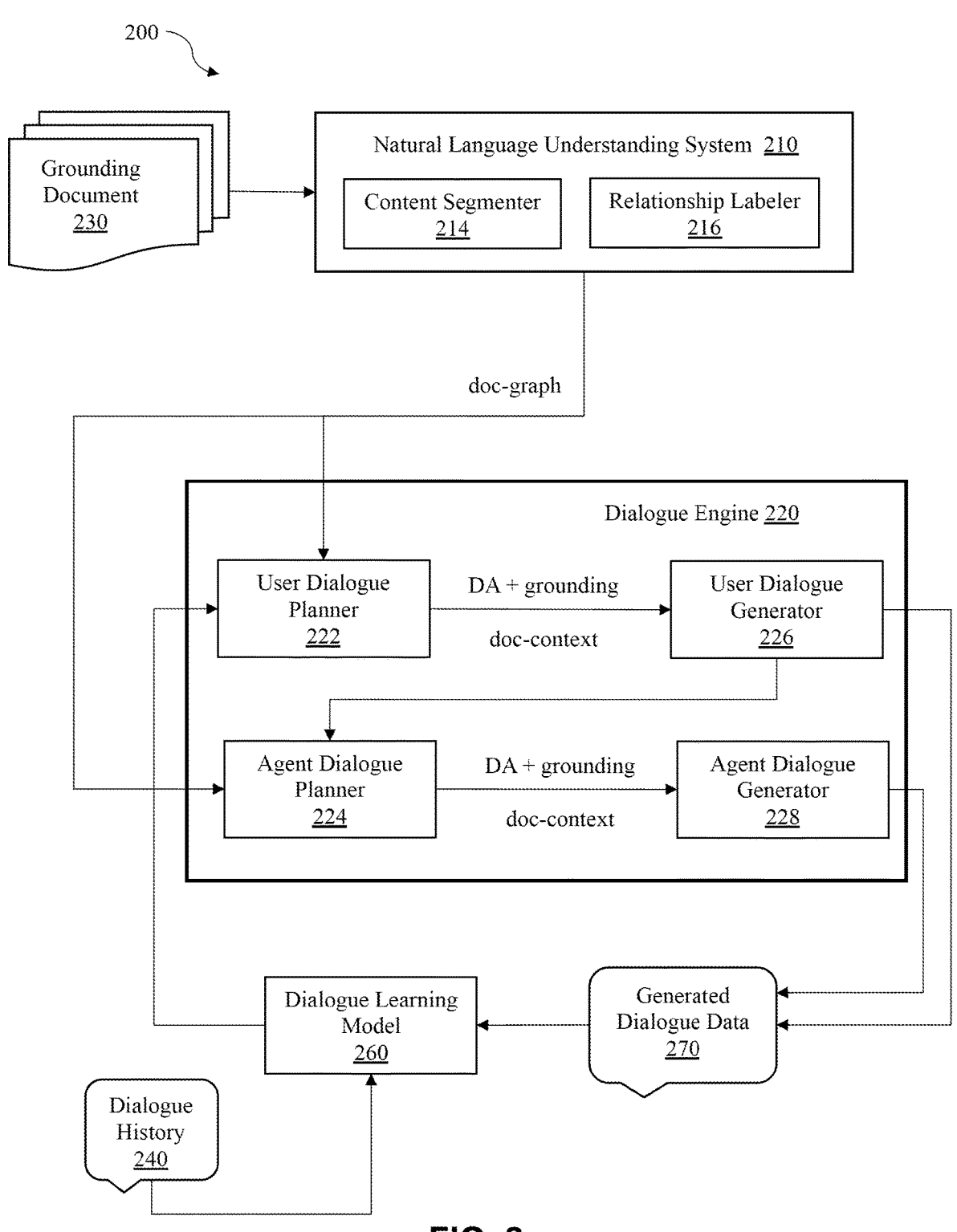
FIG. 2 illustrates an example diagram for generating a goal-oriented dialogue using a goal-oriented dialogue system, in accordance with some embodiments of the present disclosure.

Referring now to FIG. 2, shown is an example diagram for generating a goal-oriented dialogue using a goal-oriented dialogue system 200, in accordance with some embodiments of the present disclosure. In the illustrated embodiment, natural language understanding (NLU) system 210 analyzes grounding document 230 and generates one or more document graphs. In embodiments, the NLU system 210 may utilize content segmenter 214 to determine relevant content of the grounding document and relationship labeler 216 to extract semantic relationships from the text and structure of the document in order to generate the document graph(s). The generated document graph may include text spans of the grounding document configured as nodes and semantic relationships configured as edges.

Dialogue Engine 220 may receive the document graph generated by NLU system 210. User dialogue planner 222 and agent dialogue planner 224 may analyze the document graph(s) and dialogue data 240 (e.g., historic dialogue acts between users and agents, scenes, utterances, etc.) to predict simulated dialogue utterances for both a simulated agent and simulated user for a next scene of a dialogue/dialogue based on the grounding document. The predicted utterances are based on analyzing and correlating the dialogue history 240, the document graph generated from the grounding document 230, and/or contextual data from the grounding document

230. For example, the agent dialogue planner 224 may use the grounding document and/or document graph to plan what is the next step, turn, or sequence of a dialogue act in response to a query from a user by pointing to a specific part of the grounding document based on its semantic structure. The user dialogue planner 222 may then predict a next user utterance based on the historic dialogue and the predicted agent utterance.

Using the predicted utterances, user dialogue generator 226 and agent dialogue generator 228 may generate simulated dialogue data 270 (e.g., simulated goal oriented dialogue). In embodiments, the simulated user dialogue data generated by user dialogue generator 226 may be used by the agent dialogue planner 224 to plan or predict the next turn in the simulated agent utterances. In embodiments, the generated dialogue data 270 may be collected and analyzed by dialogue learning model 260. Dialogue learning model 260 may analyze the generated dialogue data 270 and evaluate the accuracy and precision of the language of the dialogue with respect to answering queries with the grounding document. The evaluation may include evaluating diversity, vocabulary, and/or perplexity of the dialogue language. Dialogue learning model 260 may also analyze the simulated agent response prediction. This may be performed by evaluation of real human user/agent dialogue data and/or grounding document content in comparison to the simulated dialogue data using various scoring evaluation techniques (e.g., exact match (EM) scoring, Bilingual Evaluation Understudy (BLEU)-4 scoring). Based on the scoring, the dialogue learning model 260 may continuously improve the generated dialogue data 270 by augmenting one or more utterances (agent/user/both) of the generated dialogue data 270 and re-analyzing the augmented dialogue data using the dialogue engine 220.

For example, dialogue learning model 260 may analyze the accuracy of the simulated utterances (agent and user) for each goal-oriented dialogue in relation to a data distribution. The dialogue learning model 260 may determine that confidence values for the given simulated utterances are low and that further adjustment/modification to the generated dialogue may be needed to improve the dialogue. The dialogue learning model 260 may update or modify at least one utterance (utterance by the simulated agent, simulated user, or both) of the simulated dialogue to improve the confidence values. In this way, the system 200 may continuously augment and evaluate the simulated dialogue until user set performance thresholds are met (e.g., precision/accuracy). Once the thresholds are met, the system 200 may use the generated dialogue data 270 to train a conversational model to respond to real end user queries. In this way, the generated goal-oriented dialogues become more accurate/effective for use when training a system to answer queries without requiring real human writers.

In embodiments, the dialogue learning model 260 may utilize machine learning algorithms to improve its capabilities. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Referring now to FIG. 3, shown is an example grounding document 300, in accordance with some embodiments of the present disclosure. In the illustrated embodiment, the grounding document 300 is an HTML document that can be obtained from a website. The grounding document 300 includes a document structure that has headings 302A and 302B and one or more subheadings and/or substructures 304. As depicted the headings pertain to clothing allowances and disability benefits while the subheadings pertain to whether a given user meets the required criteria for the given heading. In embodiments, the goal-oriented device 102 may analyze the grounding document 300 and use the document structure as guidance for providing simulated responses to simulated user queries of a goal-oriented dialogue.

Figure 4:
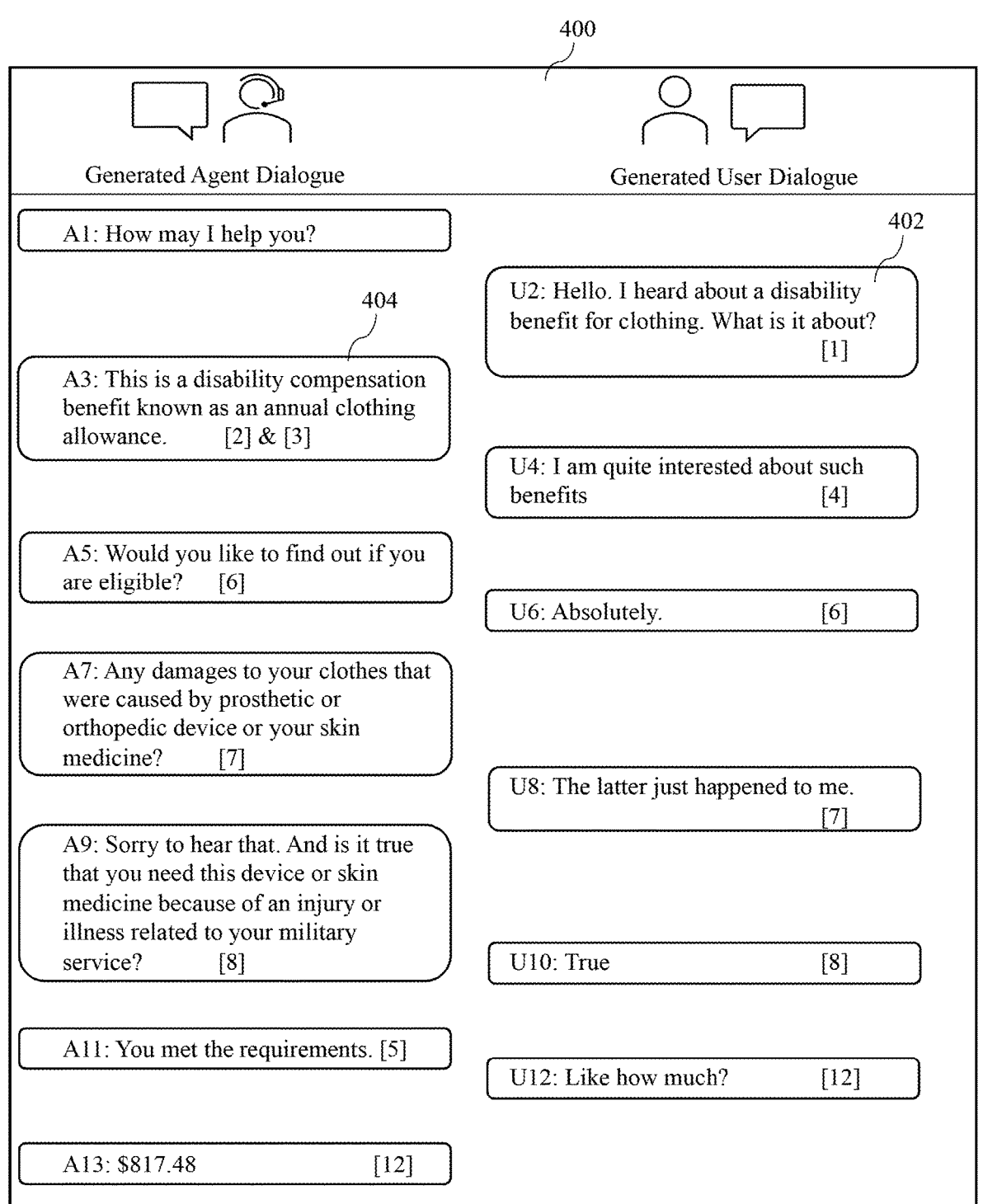
FIG. 4 illustrates an example simulated dialogue between a simulated agent and a simulated user, in accordance with some embodiments of the present disclosure.

Referring now to FIG. 4, shown an example simulated dialogue 400 between a simulated agent and a simulated user, in accordance with some embodiments of the present disclosure. In the illustrated embodiment, the simulated dialogue 400 comprises generated agent dialogue responses (answers) A1, A3, A5, A7, A9, A11, and A13 and generated user dialogue queries U2, U4, U6, U8, U10, and U12. The generated agent dialogue responses are generated from the document structure and contextual data of the grounding document. For example, response 404 is generated from the document structure and context [2] & [3] of grounding document 300 described in FIG. 3. While the generated user dialogue queries are generated by correlation of the grounding document/context with historic dialogue data (or dialogue act). For example, query 402 may be generated from both historic queries by users and the context [1] from the grounding document 300. For example, historic queries may include various utterances by users stating, "Hello, I heard about X, what is it about?", where X can be any type of thing based on past user dialogues. Using this historic query and the context of the grounding document, simulated user queries can be generated with respect to the grounding document by substituting context of the grounding document to create simulated queries for training the system.

Referring now to FIG. 5, shown is an example dialogue planner 500, in accordance with some embodiments of the present disclosure. Dialogue planner 500 may be configured as user dialogue planner 222 and/or agent dialogue planner 224 as described in FIG. 2 and is not meant to be limiting. In embodiments, dialogue planner 500 utilizes a transformer-based sequence-to-sequence model (e.g., BART-like model) for making dialogue predictions.

In the illustrated embodiment, the example dialogue planner 500 is configured to input a text sequence (e.g., grounding document, document graph, and/or dialogue data) and output the text span on which the next utterance should be grounded and the dialogue act of the next turn. In embodiments, dialogue planner 500 uses encoder 506 to process each word 504 of the grounding document and the dialogue data. The encoder 506 may collect and encode various information about each word by processing extracted contextual features and structure content 502 from the grounding document and the dialogue data. The contextual features and structure content 502 may include tokens, token embeddings, type of embedding, and structural embeddings, for each natural language word of the grounding document and dialogue data (historic dialogue act). Both Agent header 510 and User header 512 take input from the encoder 506 and train with multi-task training objectives. Agent header 510 points to the specific structure and/or sequence of the grounding document for predicting the simulated agent's response of the next turn of the dialogue act of the simulated dialogue. This may be determined using the document graph and/or document tree. User header 512 may point to a next turn or follow-up dialogue act for a user query based on historic dialogue data.

Figures 6A, 6B, 6C:
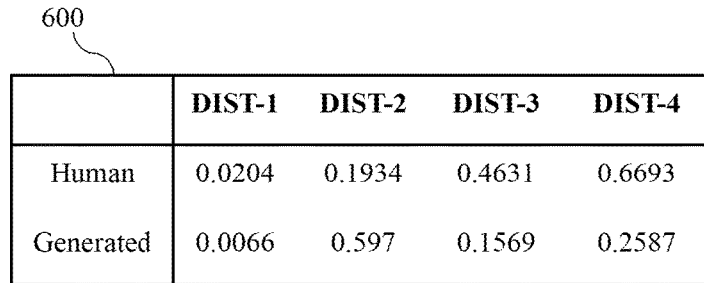
FIG. 6A-6C illustrate results for generating goal-oriented dialogues, in accordance with some embodiments of the present disclosure.

Referring now to FIG. 6A-6C, shown are results for generating goal-oriented dialogues in comparison to human generated dialogues, in accordance with some embodiments of the present disclosure. FIG. 6A shows a language diversity table 602 which compares language diversity of human created dialogues versus language diversity of goal-oriented dialogues generated using the dialogue model. The language diversity table 600 includes language diversity distributions DIST-1, DIST-2, DIST-3, and DIST-4. As shown in the table 600, the results indicate that human created dialogues include more diverse language in comparison with the generated goal-oriented dialogues produced by the dialogue model as further iterations of dialogues increase. However, despite the generated goal-oriented dialogues being less diverse, the results indicate that language diversity of the generated goal-oriented dialogues may mimic human created conversations as the dialogue model is trained.

FIG. 6B shows a unique n-grams dialogue table 602 for human created dialogues versus generated dialogues. The table 602 includes UNIQUE-1, UNIQUE-2, UNIQUE-3, and UNIQUE-4 which are the respective count of unique n-grams based on the number of turns in the human and generated dialogues. The results of table 602 indicate that the human created dialogues are more diverse than the goal-oriented dialogues generated using the dialogue model. However, the results show that the dialogue model may produce diverse dialogues that mimic the human created dialogue by performing dialogue generation using grounding documents and dialogue history data.

FIG. 6C shows an Auto-Regressive Transformer (BART)-base Generation table 604 for validation and testing the goal-oriented dialogues. In the illustrated embodiment, the inventors performed an experiment using the Auto-Regressive transformer to validate and test training dialogue data. The initial training data included 100% training data that was generated by human users. The training data was then augmented using simulated dialogues that were n times the size of the original data for the generated data by the dialogue model. For example, 100 real conversations between 100 agents and 100 users may comprise the initial training data. The 100 real conversations may be augmented using the dialogue model and a grounding document in order to generate 100 simulated conversation in the first training round. This process was iterated for additional training rounds as shown in the table 604. As each training round is implemented with more augmented training data, the dialogue model showed improvement in the results as described below.

In the illustrated embodiment, the BART-base generation was performed using 100% training data, 100% training data+1 times training data augmentation, 100% training data+2 times training data augmentation, 100% training data+3 times training data augmentation, and 100% training data+3 times training data augmentation and +1 time validation augmentation. The results include validation and testing results for both Exact Match (EM) and Bilingual Evaluation Understudy (BLEU)-4 scoring. The EM score is a performance metric that captures the precision and recall that the words chosen as being part of the answer are actually part of the correct answer. The BLEU-4 score is used for comparing a candidate translation of text to one or more reference translations. The validation results indicate that 100% training data+3 times training data augmentation+1 times validation augmentation produce the best EM score at 32.45, while 100% training data+3 times training data augmentation produces the best BLEU-4 score at 32.64. The testing results indicate that 100% training data+3 times training data augmentation produce the best EM and BLEU-4 scores at 31.28 and 35.15, respectively. The experimental results show that the system may improve accuracy and precision of the simulated dialogues by continuously augmenting the training data and retesting. In this way, the system may be used to training a conversational model without using human generated dialogue content.

FIG. 7 illustrates an example process 700 for generating a goal-oriented dialogue, in accordance with some embodiments of the present disclosure. The process 700 may be performed by processing logic that comprises hardware (e.g., circuitry, dedicated logic, programmable logic, microcode, etc.), software (e.g., instructions run on a processor), firmware, or a combination thereof. In some embodiments, the process 700 is a computer-implemented process. In embodiments, the process 700 may be performed by processor 106 of goal-oriented dialogue device 102 exemplified in FIG. 1.

The process 700 begins by analyzing a corpus of text. This is illustrated at step 705. In embodiments, the analyzing may be performed using natural language understanding and/or natural language processing. In embodiments, the corpus of text includes one or more grounding documents having a set of semantic structures and historic dialogue data. A grounding document may include headings, subheadings, subsections, etc. For example, the grounding document may comprise a document having a title, subtitle, subsections, and various bullet points used for answering a user's query or achieve the user's goal (e.g., manual, guidebook, operating instructions, handbook, questionnaire, etc.). The historic dialogue data may include one or more historic dialogue acts comprising queries from a user and responses/answers to the given query from an agent. In embodiments, the system may generate one or more document graphs from the set of semantic structures of the grounding document. The document graph may include text spans configured as nodes and semantic relations as edges. The document graph may be used to understand the structure and context of the grounding document in order to answer a user's query or goal.

The process 700 continues by identifying, based on the analyzing, one or more semantic structures that can be used to simulate a dialogue. This is illustrated at step 710.

In embodiments, the identifying may include correlating contextual data and the set of semantic structures of the grounding document with a plurality of utterances (user and/or agent utterances) from the historic dialogue act. The correlation may be performed using the document graph generated above. Based on the correlation, the system may predict a simulated user utterance and a simulated agent utterance to form a dialogue flow. For example, the system may use the document graph and historic dialogue data/dialogue act as input and generate a next turn or scene in the dialogue act for both the simulated user and the simulated agent. In some embodiments, the predicting is performed, in part, using a document decision tree and/or the document graph.

In embodiments, the simulated user utterances and the simulated agent utterances may be predicted by a user dialogue planner and an agent dialogue planner, respectively. The user dialogue planner and the agent dialogue planner may use a transformer-based sequence-to-sequence model (e.g., a Bidirectional and Auto-Regressive Transformer (BART) model) for making dialogue predictions. The planners are configured to predict what the most effective response by the simulated agent (agent utterance) should be using the grounding document and a next simulated question from the user (user utterance) based on the historic dialogue act.

The process 700 continues by generating, based on the identifying, a simulated dialogue. This is illustrated at step 715. The simulated dialogue may be generated from the predicted simulated agent utterances and the predicted user utterances to form a dialogue flow. In embodiments, a user dialogue generator will generate the simulated user utterances based on the predictions made by the user dialogue planner, and an agent dialogue generator will generate the simulated agent utterance based on the predictions made by the agent dialogue planner with respect to the grounding document.

In some embodiments, the process 700 continues by analyzing, using a dialogue learning model, the simulated dialogue in relation to the corpus of text (e.g., grounding document, historic dialogue data). This is illustrated at step 720.

In some embodiments, the process 700 continues by generating, using the dialogue learning model, a data distribution for evaluating the simulated dialogue. This is illustrated at step 725. For example, the dialogue learning model may determine how accurate the simulated dialogue is for answering a given query based on the data distribution. The dialogue learning model may compare the precision/accuracy of the simulated dialogue with respect to the content of the grounding document.

In some embodiments, the process 700 continues by modifying, using the dialogue learning model and based on the data distribution, the simulated dialogue to a second simulated dialogue. This is illustrated at step 730. For example, if the simulated dialogue is not accurate based on the data distribution, the dialogue learning model may modify the simulated dialogue to a second simulated dialogue. The second simulated dialogue includes at least one alternative utterance by a simulated agent and/or a simulated user.

In some embodiments, the process 700 returns to step 705 where the second simulated dialogue is added to the corpus of text to be analyzed. For example, once modified, the system may reanalyze the modified simulated dialogue as historic dialogue input and make further dialogue predictions based on the modified simulated dialogue. In embodiments, the dialogue learning model may continually adjust/modify/augment the simulated dialogue to improve the accuracy/precision of the system for use in answering queries. Once precision and accuracy thresholds have been met, the simulated dialogues may be used to train a conversational model (e.g., chatbot) to respond to real end user queries.

Figure 8:
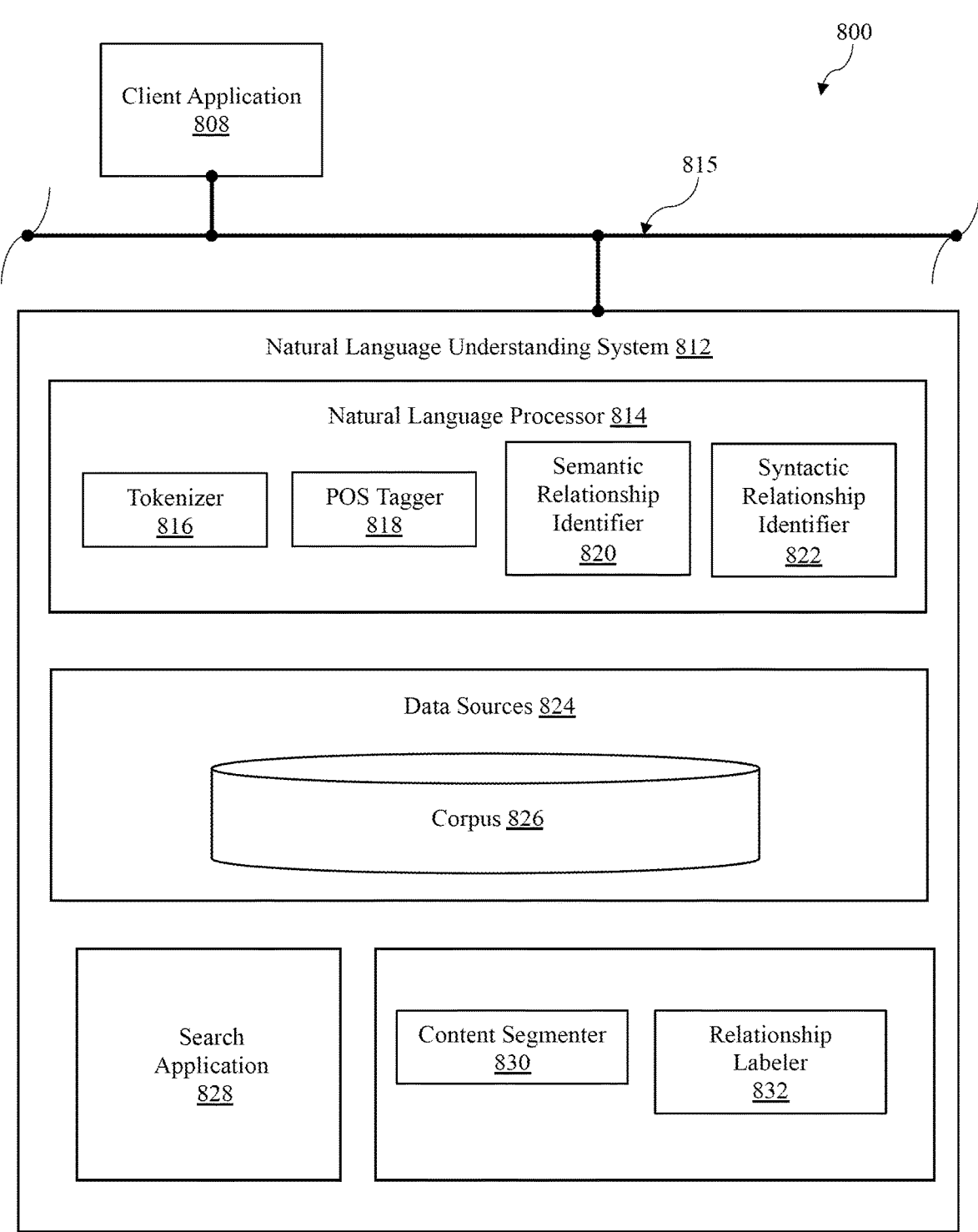
FIG. 8 illustrates a block diagram of an example natural language understanding system configured to analyze unstructured textual data from a grounding document and historical dialogue data, in accordance with some embodiments of the present disclosure.

Referring now to FIG. 8, shown is a block diagram of an exemplary system architecture 800, including a natural language understanding system 812, configured to analyze unstructured textual data from a grounding document and historical dialogue data, in accordance with some embodiments of the present disclosure. In embodiments, dialogue/conversation threads/utterances collected from grounding documents 130 and dialogue data 140 may be analyzed by the natural language understanding system 812 which may be housed on goal-oriented dialogue device 102 of FIG. 1. The goal-oriented dialogue device 102 may include a client application 808, which may be used to initiate collecting and analyzing the grounding documents 130 and dialogue data 140 over network 815.

Consistent with various embodiments, the natural language understanding system 812 may respond to goal-oriented dialogue generation functions initiated by the client application 808. Specifically, the natural language understanding system 812 may analyze conversation threads to extract contextual information to identify various context and/or attributes related to generation of goal-oriented dialogues. In some embodiments, the natural language understanding system 812 may include a natural language processor 814, data sources 824, a search application 828, content segmenter 830, and relationship labeler 832. The natural language processor 814 may be a computer module that analyzes the grounding documents, semantic structures, dialogues, conversation thread/utterance data, associated metadata, unstructured data, etc. The natural language processor 814 may perform various methods and techniques for analyzing the contextual data (e.g., syntactic analysis, semantic analysis, etc.). The natural language processor 814 may be configured to recognize and analyze any number of natural languages. In some embodiments, the natural language processor 814 may parse textual content of the grounding documents and dialogue data. Further, the natural language processor 814 may include various modules to perform analyses of textual data. These modules may include, but are not limited to, a tokenizer 816, a part-of-speech (POS) tagger 818, a semantic relationship identifier 820, and a syntactic relationship identifier 822.

In some embodiments, the tokenizer 816 may be a computer module that performs lexical analysis. The tokenizer 816 may convert a sequence of characters into a sequence of tokens. A token may be a string of characters included in an electronic document (text document, spreadsheet, webpage, etc.) and categorized as a meaningful symbol. Further, in some embodiments, the tokenizer 816 may identify word boundaries in an electronic document and break any text passages within the document into their component text elements, such as words, multiword tokens, numbers, and punctuation marks. In some embodiments, the tokenizer 816 may receive a string of characters, identify the lexemes in the string, and categorize them into tokens.

Consistent with various embodiments, the POS tagger 818 may be a computer module that marks up a word in passages to correspond to a particular part of speech. The POS tagger 818 may read a passage or other text in natural language and assign a part of speech to each word or other token. The POS tagger 818 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one article on an entity may shed light on the meaning of text elements in another article on the same entity, particularly if they are part of the same corpus or universe). Examples of parts of speech that may be assigned to words include, but are not limited to, nouns, verbs, adjectives, adverbs, and the like. Examples of other part of speech categories that POS tagger 818 may assign include, but are not limited to, comparative or superlative adverbs, wh-adverbs, conjunctions, determiners, negative particles, possessive markers, prepositions, wh-pronouns, and the like. In some embodiments, the POS tagger 818 may tag or otherwise annotate tokens of a passage with part of speech categories. In some embodiments, the POS tagger 818 may tag tokens or words of a passage to be parsed by the natural language understanding system 812.

In some embodiments, the semantic relationship identifier 820 may be a computer module that may be configured to identify semantic relationships of recognized text elements (e.g., words, phrases) in electronic documents and/or conversation threads. In some embodiments, the semantic relationship identifier 820 may determine functional dependencies between entities and other semantic relationships.

Consistent with various embodiments, the syntactic relationship identifier 822 may be a computer module that may be configured to identify syntactic relationships in a passage composed of tokens. The syntactic relationship identifier 822 may determine the grammatical structure of sentences such as, for example, which groups of words are associated as phrases and which word is the subject or object of a verb. The syntactic relationship identifier 822 may conform to formal grammar.

In some embodiments, the natural language processor 814 may be a computer module that may parse textual data of a grounding document and historical dialogue data (e.g., historical dialogue acts/scene) to identifying and generating answers and response to queries for a given domain topic.

In some embodiments, the output of the natural language processor 814 may be stored as an information corpus 826 in one or more data sources 824. In some embodiments, data sources 824 may include data warehouses, information corpora, data models, and document repositories. The information corpus 826 may enable data storage and retrieval. In some embodiments, the information corpus 826 may be a storage mechanism that houses a standardized, consistent, clean, and integrated copy of the ingested and parsed ground documents and dialogue data used to generate confidence values between generated goal-oriented dialogues and human generated dialogues. Data stored in the information corpus 826 may be structured in a way to specifically address analytic requirements. In some embodiments, the information corpus 826 may be a relational database.

In some embodiments, the natural language understanding system 812 may include a content segmenter 830. The content segmenter 830 may be a computer module that is configured to determine relevant content of the grounding document by analyzing the semantic structure of the document and segmenting the content to be used for responding to generated user queries.

In some embodiments, the natural language understanding system 812 may include a relationship labeler 832. The relationship labeler 832 may be a computer module that is configured to extract semantic relationships from the text of the document in order to generate one or more document graphs.

Figure 9:
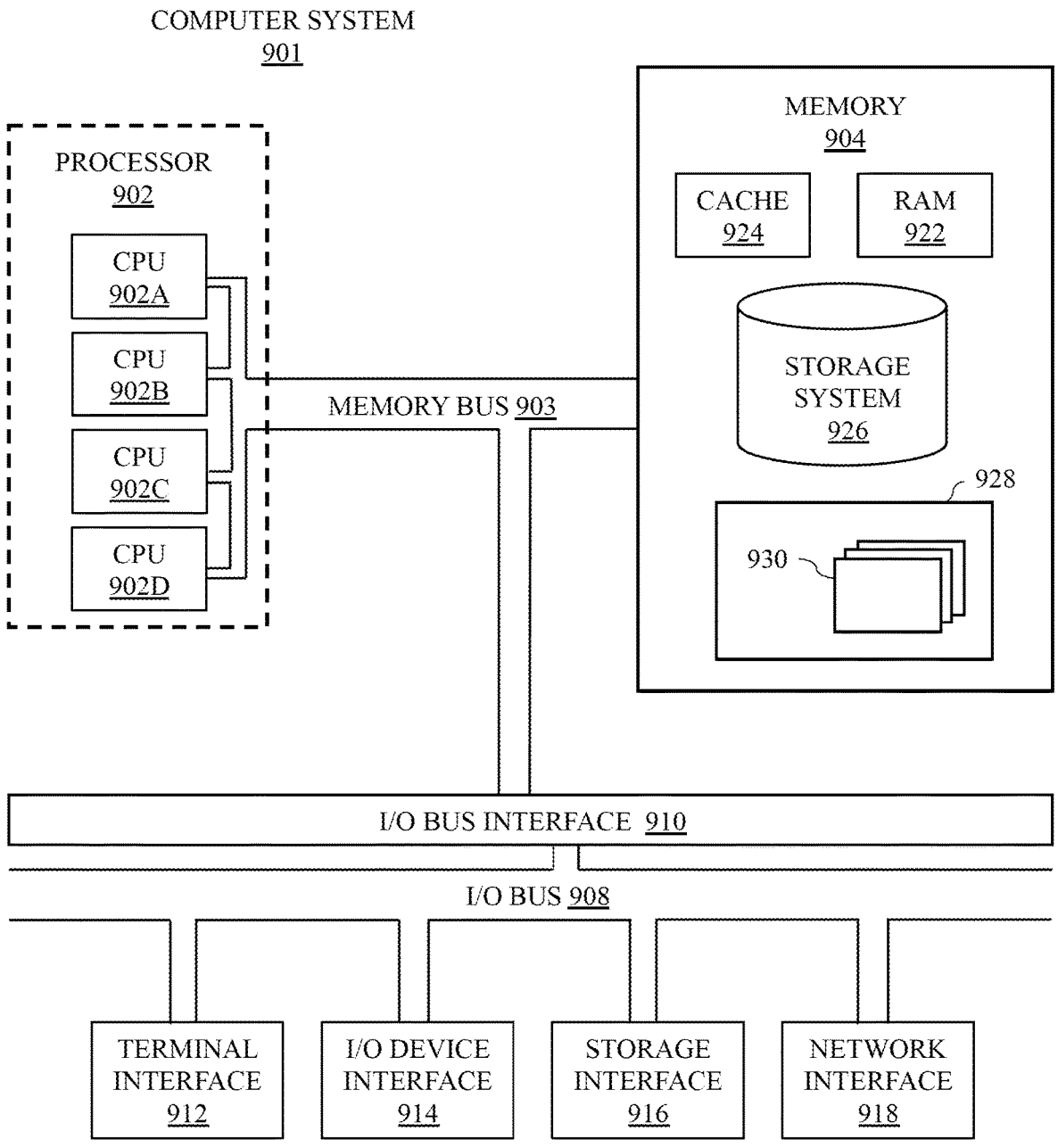
FIG. 9 illustrates a high-level block diagram of an example computer system that may be used in implementing one or more of the methods, tools, and modules, and any related functions, described herein, in accordance with embodiments of the present disclosure.

Referring now to FIG. 9, shown is a high-level block diagram of an example computer system 901 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 901 may comprise one or more CPUs 902, a memory subsystem 904, a terminal interface 912, a storage interface 916, an I/O (Input/Output) device interface 914, and a network interface 918, all of which may be communicatively coupled, directly or indirectly, for inter-component communication via a memory bus 903, an I/O bus 908, and an I/O bus interface 910.

The computer system 901 may contain one or more general-purpose programmable central processing units (CPUs) 902A, 902B, 902C, and 902D, herein generically referred to as the CPU 902. In some embodiments, the computer system 901 may contain multiple processors typical of a relatively large system; however, in other embodiments the computer system 901 may alternatively be a single CPU system. Each CPU 902 may execute instructions stored in the memory subsystem 904 and may include one or more levels of on-board cache. In some embodiments, a processor can include at least one or more of, a memory controller, and/or storage controller. In some embodiments, the CPU can execute the processes included herein (e.g., process 700 as described in FIG. 7). In some embodiments, the computer system 901 may be configured as goal-oriented dialogue system 100 of FIG. 1.

System memory subsystem 904 may include computer system readable media in the form of volatile memory, such as random-access memory (RAM) 922 or cache memory 924. Computer system 901 may further include other removable/non-removable, volatile/non-volatile computer system data storage media. By way of example only, storage system 926 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 904 can include flash memory, e.g., a flash memory stick drive or a flash drive. Memory devices can be connected to memory bus 903 by one or more data media interfaces. The memory subsystem 904 may include at least one program product having a set (e.g., at least one) of program modules that are configured to carry out the functions of various embodiments.

Although the memory bus 903 is shown in FIG. 9 as a single bus structure providing a direct communication path among the CPUs 902, the memory subsystem 904, and the I/O bus interface 910, the memory bus 903 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 910 and the I/O bus 908 are shown as single units, the computer system 901 may, in some embodiments, contain multiple I/O bus interfaces 910, multiple I/O buses 908, or both. Further, while multiple I/O interface units are shown, which separate the I/O bus 908 from various communications paths running to the various I/O devices, in other embodiments some or all of the I/O devices may be connected directly to one or more system I/O buses.

In some embodiments, the computer system 901 may be a multi-user mainframe computer system, a single-user system, or a server computer or similar device that has little or no direct user interface, but receives requests from other computer systems (clients). Further, in some embodiments, the computer system 901 may be implemented as a desktop computer, portable computer, laptop or notebook computer, tablet computer, pocket computer, telephone, smart phone, network switches or routers, or any other appropriate type of electronic device.

It is noted that FIG. 9 is intended to depict the representative major components of an exemplary computer system 901. In some embodiments, however, individual components may have greater or lesser complexity than as represented in FIG. 9, components other than or in addition to those shown in FIG. 9 may be present, and the number, type, and configuration of such components may vary.

One or more programs/utilities 928, each having at least one set of program modules 930 may be stored in memory subsystem 904. The programs/utilities 928 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 928 and/or program modules 930 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various search servers through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
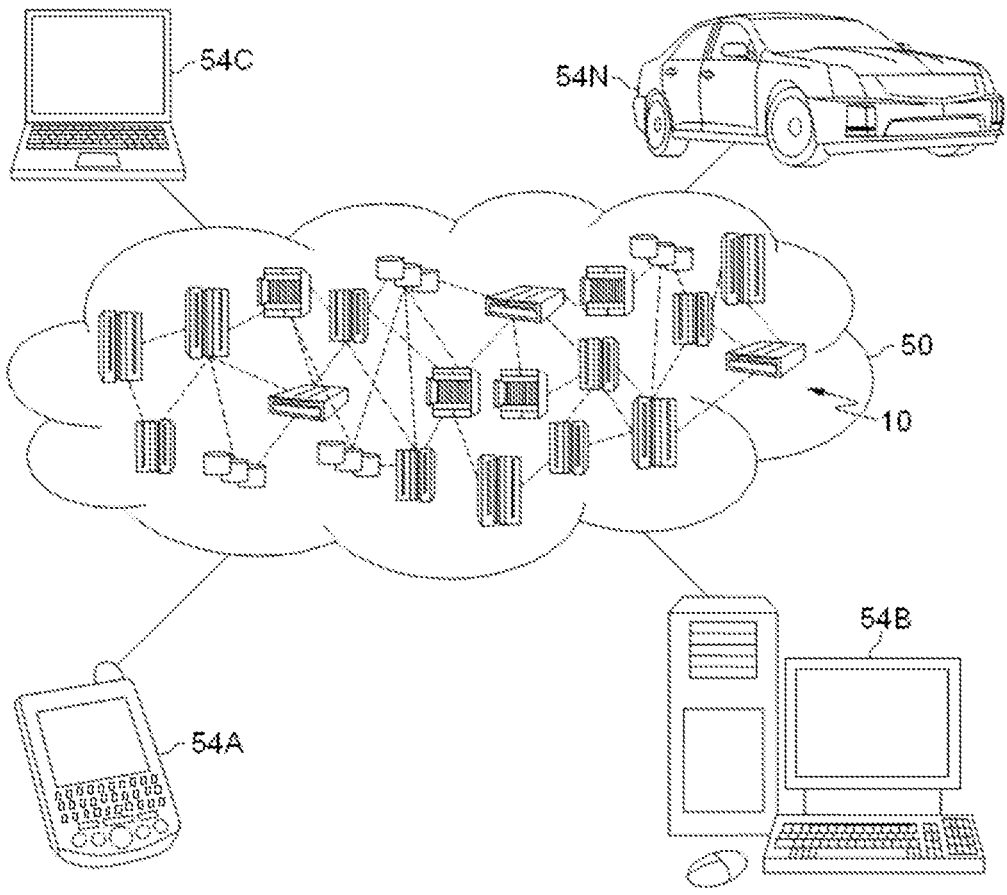
FIG. 10 depicts a cloud computing environment in accordance with embodiments of the present disclosure.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
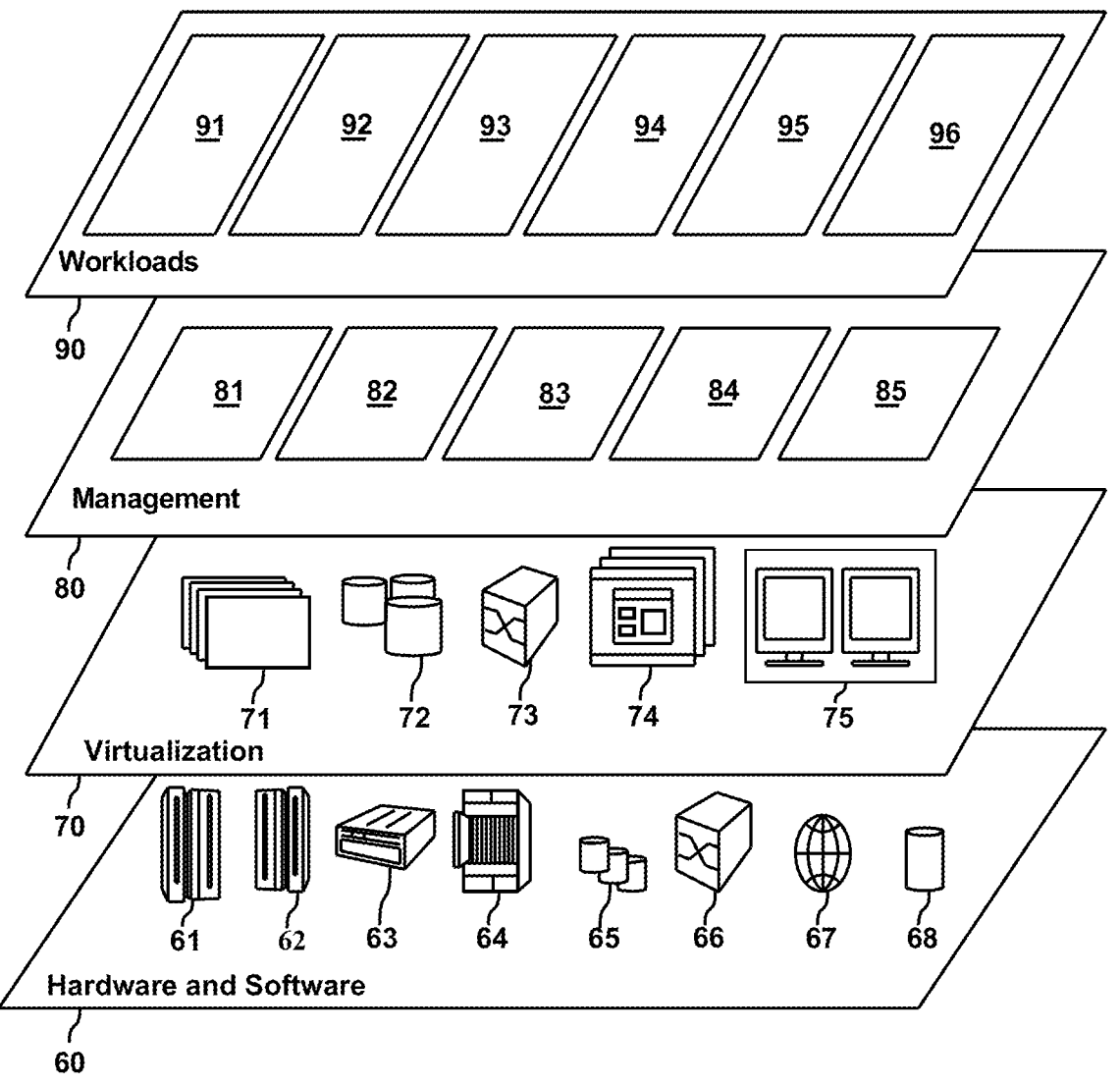
FIG. 11 depicts abstraction model layers in accordance with embodiments of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and dialogue generating software 68 in relation to the goal-oriented dialogue device 102 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dialogue generation management and processing 96. For example, goal-oriented dialogue device 102 of FIG. 1 may be configured to manage dialogue generation using workloads layer 90.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for generating a goal-oriented dialogue, the method comprising:

receiving a corpus comprising a grounding document and historic dialogue data pair, the corpus including a grounding document having structured text organized by a set of semantic structures defining text spans of related text within the corpus, the corpus further including historic dialogue data related to the grounding document and generated by human agents and users;

generating, by a natural language understanding system, a document graph from the set of semantic structures of the grounding document;

analyzing, by the natural language understanding system, the received corpus and the generated document graph for contextual data corresponding to the set of semantic structures;

identifying, based on the analyzing, one or more semantic structures for use by a transformer-based sequence-to-sequence model to make dialogue predictions;

correlating, by a dialogue engine, the contextual data and the one or more semantic structures of the corpus of text with a plurality of utterances from the historic dialogue data;

predicting, by the transformer-based sequence-to-sequence model using at least the generated document graph, a plurality of potential utterances from an agent, and a plurality of potential utterances from a user;

generating, by a dialogue generator, a simulated dialogue based on correlated utterances of the plurality of utterances from the historic dialogue data to supplement the historic dialogue data for training a conversational model, wherein the plurality of potential utterances from the agent are correlated to next potential utterances from the user based on analysis of the received corpus;

analyzing, by the dialogue engine, the simulated dialogue in relation to the corpus to determine an accuracy level of content of the simulated dialogue based on content of the corpus; and responsive to an accuracy threshold being met by the simulated dialogue, supplementing a training of the conversational model to respond to actual user queries, the supplemented training based on the simulated dialogue in addition to the historic dialogue data of the corpus.

2. The computer-implemented method of claim 1, further comprising:

generating, by the dialogue engine, a data distribution for evaluating the simulated dialogue, the data distribution being a basis for determining the accuracy level; and modifying, by the dialogue engine and based on the accuracy level, the simulated dialogue to a second simulated dialogue, the second simulated dialogue including augmented content of the simulated dialogue; wherein:

responsive to the accuracy threshold being met by the second simulated dialogue, training the conversational model to respond to the actual user queries, the training based on the second simulated dialogue.

3. The computer-implemented method of claim 2, wherein the second simulated dialogue includes at least one alternative utterance by the simulated agent and/or the simulated user.

4. A system comprising:

a processor; and a computer-readable storage medium communicatively coupled to the processor and storing program instructions which, when executed by the processor, cause the processor to perform a method comprising:

receiving a corpus comprising a grounding document and historic dialogue data pair, the corpus including a grounding document having structured text organized by a set of semantic structures defining text spans of related text within the corpus, the corpus further including historic dialogue data related to the grounding document and generated by human agents and users;

generating, by a natural language understanding system, a document graph from the set of semantic structures of the grounding document;

analyzing, by the natural language understanding system, the received corpus and the generated document graph for contextual data corresponding to the set of semantic structures;

identifying, based on the analyzing, one or more semantic structures for use by a transformer-based sequence-to-sequence model to make dialogue predictions;

correlating, by a dialogue engine, the contextual data and the one or more semantic structures of the corpus of text with a plurality of utterances from the historic dialogue data;

predicting, by the transformer-based sequence-to-sequence model using at least the generated document graph, a plurality of potential utterances from an agent, and a plurality of potential utterances from a user;

generating, by a dialogue generator, a simulated dialogue based on correlated utterances of the plurality of utterances from the historic dialogue data to supplement the historic dialogue data for training a conversational model, wherein the plurality of potential utterances from the agent are correlated to next potential utterances from the user based on analysis of the received corpus;

analyzing, by the dialogue engine, the simulated dialogue in relation to the corpus to determine an accuracy level of content of the simulated dialogue based on content of the corpus; and responsive to an accuracy threshold being met by the simulated dialogue, supplementing a training of the conversational model to respond to actual user queries, the supplemented training based on the simulated dialogue in addition to the historic dialogue data of the corpus.

5. The system of claim 4, wherein the method performed by the processor further comprises:

generating, by the dialogue engine, a data distribution for evaluating the simulated dialogue, the data distribution being a basis for determining the accuracy level; and modifying, by the dialogue engine and based on the accuracy level, the simulated dialogue to a second simulated dialogue, the second simulated dialogue including augmented content of the simulated dialogue; wherein:

responsive to the accuracy threshold being met by the second simulated dialogue, training the conversational model to respond to the actual user queries, the training based on the second simulated dialogue.

6. A computer program product comprising a computer-readable storage medium having program instructions embodied therewith, the program instructions executable by a processor to cause the processor to perform a method comprising:

receiving a corpus comprising a grounding document and historic dialogue data pair, the corpus including a grounding document having structured text organized by a set of semantic structures defining text spans of related text within the corpus, the corpus further including historic dialogue data related to the grounding document and generated by human agents and users;

generating, by a natural language understanding system, a document graph from the set of semantic structures of the grounding document;

analyzing, by the natural language understanding system, the received corpus and the generated document graph for contextual data corresponding to the set of semantic structures;

identifying, based on the analyzing, one or more semantic structures for use by a transformer-based sequence-to-sequence model to make dialogue predictions;

correlating, by a dialogue engine, the contextual data and the one or more semantic structures of the corpus of text with a plurality of utterances from the historic dialogue data;

predicting, by the transformer-based sequence-to-sequence model using at least the generated document graph, a plurality of potential utterances from an agent, and a plurality of potential utterances from a user;

generating, by a dialogue generator, a simulated dialogue based on correlated utterances of the plurality of utterances from the historic dialogue data to supplement the historic dialogue data for training a conversational model, wherein the plurality of potential utterances from the agent are correlated to next potential utterances from the user based on analysis of the received corpus;

analyzing, by the dialogue engine, the simulated dialogue in relation to the corpus to determine an accuracy level of content of the simulated dialogue based on content of the corpus; and responsive to an accuracy threshold being met by the simulated dialogue, supplementing a training of the conversational model to respond to actual user queries, the supplemented training based on the simulated dialogue in addition to the historic dialogue data of the corpus.

7. The computer program product of claim 6, wherein the method performed by the processor further comprises:

generating, by the dialogue engine, a data distribution for evaluating the simulated dialogue, the data distribution being a basis for determining the accuracy level; and modifying, by the dialogue engine and based on the accuracy level, the simulated dialogue to a second simulated dialogue, the second simulated dialogue including augmented content of the simulated dialogue; wherein:

responsive to the accuracy threshold being met by the second simulated dialogue, training the conversational model to respond to the actual user queries, the training based on the second simulated dialogue.

8. The computer-implemented method of claim 1, wherein generating the document graph includes:

determining relevant context of the grounding document; and extracting semantic relationships from the set of semantic structures defining text spans of related text within the corpus.

9. The computer-implemented method of claim 1, wherein the accuracy threshold is based on a scoring evaluation technique comparing the content of the corpus with the content of the simulated dialogue.

10. The system of claim 4, wherein the second simulated dialogue includes at least one alternative utterance by the simulated agent and/or the simulated user.

11. The system of claim 4, wherein generating the document graph includes:

determining relevant context of the grounding document; and extracting semantic relationships from the set of semantic structures defining text spans of related text within the corpus.

12. The system of claim 4, wherein the accuracy threshold is based on a scoring evaluation technique comparing the content of the corpus with the content of the simulated dialogue.

13. The computer program product of claim 6, wherein the second simulated dialogue includes at least one alternative utterance by the simulated agent and/or the simulated user.

14. The computer program product of claim 6, wherein generating the document graph includes:

determining relevant context of the grounding document; and extracting semantic relationships from the set of semantic structures defining text spans of related text within the corpus.

15. The computer program product of claim 6, wherein the accuracy threshold is based on a scoring evaluation technique comparing the content of the corpus with the content of the simulated dialogue.

* * * * *